United States Patent
Davis et al.

(10) Patent No.: US 10,740,603 B2
(45) Date of Patent: Aug. 11, 2020

(54) EXTRACTING DATA FROM ELECTRONIC DOCUMENTS

(71) Applicant: Drilling Info, Inc., Austin, TX (US)

(72) Inventors: Chris Randy Larsen Davis, Austin, TX (US); Yenming Mark Lai, Austin, TX (US)

(73) Assignee: Drilling Info, Inc., Austin, TX (US)

( * ) Notice: Subject to any disclaimer, the term of this patent is extended or adjusted under 35 U.S.C. 154(b) by 225 days.

(21) Appl. No.: 15/928,349

(22) Filed: Mar. 22, 2018

(65) Prior Publication Data

US 2018/0276462 A1 Sep. 27, 2018

Related U.S. Application Data

(60) Provisional application No. 62/474,978, filed on Mar. 22, 2017.

(51) Int. Cl.
*G06F 17/00* (2019.01)
*G06K 9/00* (2006.01)
(Continued)

(52) U.S. Cl.
CPC ........ *G06K 9/00469* (2013.01); *G06F 16/93* (2019.01); *G06K 9/00449* (2013.01);
(Continued)

(58) Field of Classification Search
None
See application file for complete search history.

(56) References Cited

U.S. PATENT DOCUMENTS 9,292,739 B1 * 3/2016 Gray .................. G06K 9/033
10,242,257 B2 * 3/2019 Hosabettu .......... G06K 9/00449
(Continued)

OTHER PUBLICATIONS

"OpenCV: Morphological Transformations", NPL, pp. 1-3, dated Dec. 23, 2016, URL:<https://docs.opencv.org/3.2.0/d9/d61/tutorial_py_morphological_ops.html > (Year: 2016).*
(Continued)

*Primary Examiner* — Mustafa A Amin
(74) *Attorney, Agent, or Firm* — Fish & Richardson P.C.

(57) ABSTRACT

A structured data processing system includes hardware processors and a memory in communication with the hardware processors. The memory stores a data structure and an execution environment. The data structure includes an electronic document. The execution environment includes a data extraction solver configured to perform operations including identifying a particular page of the electronic document; performing an optical character recognition (OCR) on the page to determine a plurality of alphanumeric text strings on the page; determining a type of the page; determining a layout of the page; determining at least one table on the page based at least in part on the determined type of the page and the determined layout of the page; and extracting a plurality of data from the determined table on the page. The execution environment also includes a user interface module that generates a user interface that renders graphical representations of the extracted data; and a transmission module that transmits data that represents the graphical representations.

63 Claims, 8 Drawing Sheets

(51) Int. Cl.
  *G06K 9/72* (2006.01)
  *G06F 16/93* (2019.01)
  *G06K 9/40* (2006.01)
  *G06K 9/32* (2006.01)
  *G06K 9/34* (2006.01)
  *G06K 9/62* (2006.01)

(52) U.S. Cl.
  CPC ........... *G06K 9/3275* (2013.01); *G06K 9/342* (2013.01); *G06K 9/346* (2013.01); *G06K 9/40* (2013.01); *G06K 9/6256* (2013.01); *G06K 9/6269* (2013.01); *G06K 9/72* (2013.01); *G06K 2209/01* (2013.01)

(56) References Cited

U.S. PATENT DOCUMENTS

| | | |
|---|---|---|
| 2005/0185841 A1 | 8/2005 | Tyan et al. |
| 2007/0118391 A1* | 5/2007 | Malaney ................ G06Q 10/00 382/229 |
| 2008/0147790 A1* | 6/2008 | Malaney ................ G06Q 10/00 709/203 |
| 2009/0073501 A1* | 3/2009 | Gutarin .............. G06K 9/00456 358/403 |
| 2011/0249905 A1* | 10/2011 | Singh ................ G06K 9/00449 382/225 |
| 2012/0082372 A1* | 4/2012 | Mittal ..................... G06K 9/38 382/159 |
| 2012/0173226 A1* | 7/2012 | McEvoy ............... G06F 17/245 704/3 |
| 2013/0173606 A1* | 7/2013 | Pasumarthi ....... G06F 16/24578 707/723 |
| 2013/0191715 A1* | 7/2013 | Raskovic ............. G06F 17/245 715/227 |
| 2014/0003712 A1* | 1/2014 | Eid ...................... G06K 9/4647 382/164 |
| 2014/0237516 A1 | 8/2014 | Candelore |
| 2015/0146984 A1 | 5/2015 | Brown |
| 2015/0379341 A1* | 12/2015 | Agrawal .................... G06T 7/11 382/176 |
| 2016/0055376 A1* | 2/2016 | Koduru .............. G06K 9/00449 382/176 |
| 2016/0117551 A1 | 4/2016 | Hausmann et al. |
| 2016/0203625 A1* | 7/2016 | Khan ..................... G06T 11/60 345/636 |

OTHER PUBLICATIONS

Cattoni et al., "Geometric layout analysis techniques for document image understanding: a review", IRST, 68, pages, 1998.
International Search Report and Written Opinion in International Application No. PCT/US2018/023703, dated Jul. 9, 2018.
O'Gorman & Kasturi, "Document Image Analysis", The Institute of Electrical and Electronics Engineers Inc., 5 pages, 1997.

\* cited by examiner

Actual Wellpath Report
No 1H
Page 3 of 5

| REFERENCE WELLPATH IDENTIFICATION | | | |
|---|---|---|---|
| Operator | Yates Petroleum Corporation | Slot | No.1H SHL |
| Area | Chaves County, NM | Well | No.1H |
| Field | (Gemini) Wildcat Abo Wolfcamp | Wellbore | No 1H AWB |
| Facility | Gemini Federal No.1H | | |

| WELLPATH DATA (139 stations) | | | | | | | | | | | | |
|---|---|---|---|---|---|---|---|---|---|---|---|---|
| MD [ft] | Inclination [°] | Azimuth [°] | TVD [ft] | Vert Sect [ft] | North [ft] | East [ft] | Grid East [srv ft] | Grid North [srv ft] | Latitude | Longitude | DLS [°/100ft] | Comments |
| 8487.00 | 7.300 | 277.800 | 8486.56 | -12.94 | 5.68 | 12.88 | 714761.08 | 736821.08 | 33°01'27.252"N | 103°46'03.016"W | 13.44 | |
| 8517.00 | 11.800 | 273.700 | 8516.13 | -8.00 | 6.14 | 7.93 | 714756.13 | 736821.54 | 33°01'27.256"N | 103°46'03.074"W | 15.16 | |
| 8549.00 | 15.400 | 271.400 | 8547.23 | -0.48 | 6.46 | 0.41 | 714748.61 | 736821.86 | 33°01'27.260"N | 103°46'03.162"W | 11.37 | |
| 8581.00 | 18.700 | 268.000 | 8577.82 | 8.89 | 6.38 | -8.96 | 714739.24 | 736821.78 | 33°01'27.260"N | 103°46'03.272"W | 10.77 | |
| 8612.00 | 22.600 | 268.400 | 8606.82 | 19.82 | 6.04 | -19.89 | 714728.31 | 736821.44 | 33°01'27.257"N | 103°46'03.401"W | 12.59 | |
| 8644.00 | 27.500 | 269.100 | 8635.81 | 33.37 | 5.75 | -33.43 | 714714.77 | 736821.15 | 33°01'27.255"N | 103°46'03.560"W | 15.34 | |
| 8676.00 | 32.000 | 270.400 | 8663.58 | 49.24 | 5.70 | -49.30 | 714698.90 | 736821.10 | 33°01'27.255"N | 103°46'03.746"W | 14.21 | |
| 8707.00 | 34.700 | 271.400 | 8689.47 | 66.27 | 5.97 | -66.34 | 714681.86 | 736821.37 | 33°01'27.259"N | 103°46'03.946"W | 8.89 | |
| 8739.00 | 37.500 | 271.700 | 8715.33 | 85.11 | 6.48 | -85.19 | 714663.02 | 736821.88 | 33°01'27.265"N | 103°46'04.168"W | 8.77 | |
| 8770.00 | 40.700 | 271.200 | 8739.38 | 104.65 | 6.97 | -104.73 | 714643.48 | 736822.37 | 33°01'27.271"N | 103°46'04.397"W | 10.37 | |
| 8801.00 | 43.800 | 270.800 | 8762.33 | 125.48 | 7.33 | -125.57 | 714622.64 | 736822.73 | 33°01'27.275"N | 103°46'04.642"W | 10.04 | |
| 8833.00 | 46.900 | 269.900 | 8784.81 | 148.24 | 7.47 | -148.33 | 714599.88 | 736822.87 | 33°01'27.278"N | 103°46'04.909"W | 9.89 | |
| 8864.00 | 50.300 | 269.600 | 8805.31 | 171.49 | 7.37 | -171.58 | 714576.63 | 736822.77 | 33°01'27.278"N | 103°46'05.182"W | 10.99 | |

FIG. 3

| | | | | | | | | | |
|---|---|---|---|---|---|---|---|---|---|
| 8896.00 | 53.100 | 269.900 | 8825.14 | 196.60 | 7.26 | -196.69 | 714551.52 | 736822.66 | 33°01'27.278"N | 103°46'05.477"W | 8.78 |
| 8927.00 | 56.000 | 270.800 | 8843.12 | 221.84 | 7.42 | -221.94 | 714526.28 | 736822.81 | 33°01'27.281"N | 103°46'05.774"W | 9.65 |
| 8959.00 | 59.400 | 271.400 | 8860.22 | 248.88 | 7.94 | -248.98 | 714499.24 | 736823.34 | 33°01'27.288"N | 103°46'06.091"W | 10.74 |
| 8989.00 | 63.100 | 271.400 | 8874.64 | 275.16 | 8.58 | -275.27 | 714472.95 | 736823.98 | 33°01'27.296"N | 103°46'06.400"W | 12.33 |
| 9021.00 | 65.700 | 271.100 | 8888.47 | 304.00 | 9.21 | -304.12 | 714444.10 | 736824.61 | 33°01'27.303"N | 103°46'06.739"W | 8.17 |
| 9053.00 | 69.100 | 270.500 | 8900.76 | 333.53 | 9.62 | -333.65 | 714414.57 | 736825.02 | 33°01'27.309"N | 103°46'07.086"W | 10.77 |
| 9084.00 | 72.800 | 269.200 | 8910.88 | 362.82 | 9.54 | -362.95 | 714385.27 | 736824.94 | 33°01'27.310"N | 103°46'07.430"W | 12.58 |
| 9115.00 | 76.800 | 269.200 | 8919.01 | 392.73 | 9.12 | -392.85 | 714355.37 | 736824.52 | 33°01'27.307"N | 103°46'07.781"W | 12.90 |
| 9147.00 | 80.800 | 268.400 | 8925.22 | 424.11 | 8.46 | -424.23 | 714323.99 | 736823.86 | 33°01'27.302"N | 103°46'08.149"W | 12.74 |
| 9178.00 | 83.500 | 268.400 | 8929.45 | 454.82 | 7.60 | -454.93 | 714293.30 | 736823.00 | 33°01'27.296"N | 103°46'08.510"W | 8.71 |
| 9206.00 | 86.300 | 268.900 | 8931.94 | 482.70 | 6.95 | -482.80 | 714265.42 | 736822.35 | 33°01'27.291"N | 103°46'08.837"W | 10.16 |
| 9210.00 | 86.400 | 270.600 | 8932.20 | 486.69 | 6.93 | -486.80 | 714261.43 | 736822.33 | 33°01'27.291"N | 103°46'08.884"W | 42.49 |
| 9247.00 | 89.100 | 270.200 | 8933.65 | 523.65 | 7.19 | -523.76 | 714224.47 | 736822.59 | 33°01'27.295"N | 103°46'09.319"W | 7.38 |
| 9273.00 | 91.000 | 270.600 | 8933.63 | 549.65 | 7.37 | -549.76 | 714198.47 | 736822.77 | 33°01'27.298"N | 103°46'09.624"W | 7.47 |
| 9305.00 | 90.800 | 270.700 | 8933.13 | 581.64 | 7.73 | -581.75 | 714166.48 | 736823.13 | 33°01'27.302"N | 103°46'10.000"W | 0.70 |
| 9337.00 | 90.500 | 270.700 | 8932.76 | 613.63 | 8.12 | -613.75 | 714134.49 | 736823.52 | 33°01'27.309"N | 103°46'10.375"W | 0.94 |
| 9369.00 | 90.300 | 270.600 | 8932.54 | 645.62 | 8.49 | -645.75 | 714102.49 | 736823.89 | 33°01'27.314"N | 103°46'10.751"W | 0.70 |
| 9400.00 | 91.500 | 270.700 | 8932.05 | 676.61 | 8.84 | -676.74 | 714071.50 | 736824.24 | 33°01'27.320"N | 103°46'11.115"W | 3.88 |
| 9463.00 | 91.600 | 271.300 | 8930.35 | 739.56 | 9.94 | -739.71 | 714008.54 | 736825.34 | 33°01'27.334"N | 103°46'11.855"W | 0.97 |
| 9527.00 | 91.100 | 269.500 | 8928.84 | 803.53 | 10.38 | -803.69 | 713944.56 | 736825.78 | 33°01'27.342"N | 103°46'12.606"W | 2.92 |
| 9590.00 | 89.600 | 269.000 | 8928.46 | 866.52 | 9.56 | -866.68 | 713881.57 | 736824.96 | 33°01'27.337"N | 103°46'13.346"W | 2.51 |
| 9653.00 | 90.600 | 268.800 | 8928.35 | 929.52 | 8.35 | -929.66 | 713818.59 | 736823.75 | 33°01'27.328"N | 103°46'14.086"W | 1.62 |
| 9717.00 | 91.500 | 270.700 | 8927.17 | 993.50 | 8.07 | -993.65 | 713754.61 | 736823.47 | 33°01'27.329"N | 103°46'14.837"W | 3.28 |
| 9780.00 | 91.500 | 271.100 | 8925.52 | 1056.46 | 9.06 | -1056.62 | 713691.64 | 736824.46 | 33°01'27.342"N | 103°46'15.577"W | 0.63 |
| 9843.00 | 91.600 | 269.300 | 8923.82 | 1119.43 | 9.28 | -1119.59 | 713628.67 | 736824.68 | 33°01'27.347"N | 103°46'16.316"W | 2.86 |
| 9906.00 | 91.400 | 268.800 | 8922.17 | 1182.41 | 8.24 | -1182.56 | 713565.71 | 736823.64 | 33°01'27.340"N | 103°46'17.056"W | 0.85 |
| 9969.00 | 91.000 | 268.300 | 8920.85 | 1245.38 | 6.64 | -1245.53 | 713502.74 | 736822.04 | 33°01'27.328"N | 103°46'17.795"W | 1.02 |
| 10032.00 | 91.200 | 268.000 | 8919.64 | 1308.36 | 4.61 | -1308.48 | 713439.79 | 736820.01 | 33°01'27.311"N | 103°46'18.535"W | 0.57 |
| 10096.00 | 91.400 | 267.900 | 8918.19 | 1372.32 | 2.32 | -1372.43 | 713375.85 | 736817.72 | 33°01'27.292"N | 103°46'19.286"W | 0.35 |
| 10159.00 | 90.900 | 267.700 | 8916.92 | 1435.28 | -0.10 | -1435.37 | 713312.92 | 736815.30 | 33°01'27.271"N | 103°46'20.025"W | 0.85 |
| 10223.00 | 91.100 | 269.100 | 8915.81 | 1499.26 | -1.89 | -1499.33 | 713248.96 | 736813.51 | 33°01'27.257"N | 103°46'20.777"W | 2.21 |
| 10286.00 | 91.200 | 269.900 | 8914.54 | 1562.25 | -2.43 | -1562.32 | 713185.98 | 736812.97 | 33°01'27.255"N | 103°46'21.516"W | 1.28 |

FIG. 3 (Cont.)

A Gyrodata Directional Survey

PARALLEL PETROLEUM
Location: #4, CHAVES COUNTY, NEW MEXICO
Lease: Well: #1, 4-1/2" DRILLPIPE
Jon Number: MD0906G_275

| MEASURED DEPTH [feet] | INCL [deg.] | AZIMUTH [deg] | DOGLEG SEVERITY [deg./100 ft.] | VERTICAL DEPTH [feet] | CLOSURE DIST [feet] | AZIMUTH [deg.] | HORIZONTAL COORDINATES [feet] | |
|---|---|---|---|---|---|---|---|---|
| 1931.56 | 1.04 | 318.77 | 0.06 | 1931.32 | 23.8 | 293.8 | 9.57 N | 21.74 W |
| 2027.10 | 1.00 | 329.07 | 0.20 | 2026.84 | 25.2 | 295.7 | 10.93 N | 22.74 W |
| 2122.64 | 1.40 | 324.03 | 0.44 | 2122.36 | 27.0 | 297.8 | 12.59 N | 23.85 W |
| 2218.18 | 1.15 | 327.39 | 0.27 | 2217.88 | 28.9 | 299.8 | 14.35 N | 25.05 W |
| 2313.72 | 0.67 | 315.37 | 0.54 | 2313.40 | 30.3 | 300.9 | 15.55 N | 25.97 W |
| 2409.26 | 0.37 | 321.66 | 0.33 | 2408.94 | 31.1 | 301.4 | 16.19 N | 26.55 W |
| 2504.80 | 0.33 | 351.12 | 0.19 | 2504.48 | 31.6 | 302.0 | 16.71 N | 26.78 W |
| 2600.34 | 0.35 | 321.82 | 0.18 | 2600.02 | 32.0 | 302.5 | 17.21 N | 27.01 W |
| 2695.88 | 0.24 | 291.39 | 0.20 | 2695.56 | 32.5 | 302.6 | 17.51 N | 27.38 W |
| 2791.42 | 0.30 | 279.31 | 0.08 | 2791.09 | 32.9 | 302.4 | 17.63 N | 27.81 W |
| 2886.96 | 0.49 | 283.02 | 0.21 | 2886.63 | 33.5 | 302.0 | 17.76 N | 28.45 W |
| 2982.50 | 0.47 | 272.40 | 0.10 | 2982.17 | 34.3 | 301.4 | 17.87 N | 29.24 W |

EXTRACTING DATA FROM ELECTRONIC DOCUMENTS

CROSS-REFERENCE TO RELATED APPLICATION

This application claims priority under 35 U.S.C. § 119 to U.S. Provisional Patent Application Ser. No. 62/474,978, filed on Mar. 22, 2017, the entire contents of which is hereby incorporated by reference into the present disclosure.

TECHNICAL FIELD

The present disclosure relates to apparatus, systems, and methods for extracting data from electronic documents, such as extracting table-formatted alpha-numeric data from scanned electronic documents.

BACKGROUND

The manual extraction of data from electronic documents, such as scanned images, is temporally and monetarily costly. Such inefficiencies can cause a backlog of hundreds of thousands of documents that any particular business or industry from which data must be extracted. Often, such electronic or scanned documents do not include a text layer. Thus, in a manual extraction process, a human must first identify the particular page or pages from the documents from which data is desired to be extracted. Such a process is time consuming and can be fraught with error as well. Further steps within the manual process are also time consuming and include, for example, separating the page or pages into a separate electronic document and correcting optical character recognition (OCR) errors where needed.

SUMMARY

An example implementation of the present disclosure includes a structured data processing system that includes one or more hardware processors and a memory in communication with the one or more hardware processors. The memory stores a data structure and an execution environment. The data structure includes an electronic document. The execution environment includes a data extraction solver configured to perform operations including identifying a particular page of the electronic document; performing an optical character recognition (OCR) on the page to determine a plurality of alphanumeric text strings on the page; determining a type of the page; determining a layout of the page; determining at least one table on the page based at least in part on the determined type of the page and the determined layout of the page; and extracting a plurality of data from the determined table on the page. The execution environment also includes a user interface module that generates a user interface that renders one or more graphical representations of the extracted data; and a transmission module that transmits, over one or more communication protocols and to a remote computing device, data that represents the one or more graphical representations.

In an aspect combinable with the example implementation, the data extraction solver is configured to perform operations further including prior to performing the OCR on the page, performing an image preprocess on the at least one page.

In another aspect combinable with any one of the previous aspects, the operation of performing the image preprocess includes determining a rotation of the at least one page.

In another aspect combinable with any one of the previous aspects, the operation of determining the rotation of the at least one page includes parsing a text file generated by the OCR to determine whether to apply rotation to the at least one page.

In another aspect combinable with any one of the previous aspects, the operation of performing the image preprocess includes rotating the page.

In another aspect combinable with any one of the previous aspects, the operation of rotating the at least one page includes rotating the page in increments of 90 degrees.

In another aspect combinable with any one of the previous aspects, the operation of performing the image preprocess includes converting gray pixels on the page to whitespace.

In another aspect combinable with any one of the previous aspects, the operation of performing the image preprocess includes removing horizontal and vertical lines on the page.

In another aspect combinable with any one of the previous aspects, the data extraction solver is configured to perform operations further including determining the horizontal and vertical lines with a closing morphological transformation using horizontal and vertical kernels.

In another aspect combinable with any one of the previous aspects, the operation of performing the image preprocess includes determining a skew of the at least one page.

In another aspect combinable with any one of the previous aspects, the data extraction solver is configured to perform operations further including, based on the skew determination, manipulating the at least one page to remove or reduce the skew.

In another aspect combinable with any one of the previous aspects, the operation of performing the OCR includes producing a hypertext markup language representation of the plurality of alphanumeric text strings.

In another aspect combinable with any one of the previous aspects, the data extraction solver is configured to perform operations further including determining a bounding rectangle for each of the plurality of alphanumeric text strings; and saving information about each of the determined bounding rectangle in a JSON format.

In another aspect combinable with any one of the previous aspects, the operation of determining the type of the page includes assigning, with a support vector machine (SVM) classifier, a binary label to the page based on a specified criteria.

In another aspect combinable with any one of the previous aspects, the specified criteria includes the page including a table.

In another aspect combinable with any one of the previous aspects, the operation of assigning, with the SVM classifier, a binary label to the page based on the specified criteria includes assigning, with the SVM classifier, the binary label to a feature vector that represents at least one of a ratio of numeric content to alphabetical content on the page, a ratio of numeric content to the length of the text on the page, and a number of specified keywords.

In another aspect combinable with any one of the previous aspects, the data extraction solver is configured to perform operations further including training the SVM classifier on a plurality of electronic training documents, where at least a portion of the plurality of electronic training documents meet the binary criteria, and at least a portion of the plurality of electronic training documents do not meet the binary criteria.

In another aspect combinable with any one of the previous aspects, the data extraction solver is configured to perform operations further including, based on the page being assigned the binary label, automatically assigning the binary label to another page immediately preceding the page in the electronic document.

In another aspect combinable with any one of the previous aspects, the data extraction solver is configured to perform operations further including, based on the page being assigned the binary label, automatically assigning the binary label to another page immediately following the page in the electronic document.

In another aspect combinable with any one of the previous aspects, the operation of determining the layout of the page includes calculating text segmentation for the plurality of alphanumeric text strings on the page.

In another aspect combinable with any one of the previous aspects, the operation of calculating the text segmentation includes identifying, based on whitespace on the page, a horizontal and vertical bounding area for each of the plurality of alphanumeric text strings.

In another aspect combinable with any one of the previous aspects, the operation of identifying the horizontal bounding areas includes identifying horizontal text rows by determining a projection profile of pixel row sums; determining, based on the projection profile, local maximum values of the pixel row sums; and determining the horizontal bounding areas based on the determined local maximum values of the pixel row sums.

In another aspect combinable with any one of the previous aspects, the operation of identifying the vertical bounding area includes comparing a pixel height of an area between adjacent horizontal bounding areas to an estimated height of specified font of the plurality of alphanumeric text strings.

In another aspect combinable with any one of the previous aspects, the data extraction solver is configured to perform operations further including calculating the estimated height based at least in part on a height and a width of the page.

In another aspect combinable with any one of the previous aspects, the operation of identifying the vertical bounding area further includes determining a projection profile of pixel column means for each determined horizontal bounding area.

In another aspect combinable with any one of the previous aspects, the data extraction solver is configured to perform operations further including determining the bounding rectangle for each of the plurality of alphanumeric text strings based on the determined horizontal and vertical bounding areas; and assigning a unique identification (ID) to each of the plurality of bounding rectangles, where each unique ID includes a concatenation of row index and value index.

In another aspect combinable with any one of the previous aspects, the operation of determining the at least one table on the page based at least in part on the determined type of the page and the determined layout of the page includes determining vertical associations and horizontal associations.

In another aspect combinable with any one of the previous aspects, the operation of determining the vertical associations includes for each alphanumeric text string in a particular horizontal text row: determining whether the alphanumeric text string is vertically aligned with one or more alphanumeric text strings in other horizontal text rows; adding the ID of any vertically aligned alphanumeric text string to a list; and saving the list to a dictionary with the row text value ID as a key to the dictionary.

In another aspect combinable with any one of the previous aspects, the data extraction solver is configured to perform operations further including comparing the determined vertical associations between adjacent horizontal associations; and based on adjacent horizontal associations having a shared, common vertical association, adding: an identification of the adjacent horizontal association to a horizontal association list in the dictionary, and an identification of the shared, common vertical association to a vertical association list in the dictionary.

In another aspect combinable with any one of the previous aspects, the operation of extracting the plurality of data from the determined table on the page includes cropping a table region of the detected table from the page.

In another aspect combinable with any one of the previous aspects, the data extraction solver is configured to perform operations further including iterating a cell value parser through the bounding rectangles.

In another aspect combinable with any one of the previous aspects, for each iteration: checking the OCR output for at least one alphanumeric text string that falls within one of the bounding rectangles; and based on at least one alphanumeric text string falling within one of the bounding rectangles, adding the alphanumeric text string to a table cell dictionary and removing the alphanumeric text string from an OCR dictionary.

In another aspect combinable with any one of the previous aspects, the data extraction solver is configured to perform operations further including combining the extracted plurality of data from the determined table on the page with extracted data from another determined table on another page; and aliasing extracted column lables associated with the combined extracted data from the determined tables of the pages.

In another aspect combinable with any one of the previous aspects, the electronic document includes a well file.

In another aspect combinable with any one of the previous aspects, the table includes a directional survey of the well file.

The example implementation and aspects may be realized in computer systems, computer-implemented methods, and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Implementations according to the present disclosure may include one or more of the following features. For example, a computer-implemented data extraction method according to the present disclosure may more efficiently (e.g., in terms of human time, cost, computing resources, computing speed) extract data, such as tabular data, from electronic images. As another example, the data extraction method according to the present disclosure may detect a table of values (of any symbols) given the two assumptions that the values are vertically aligned (e.g., all left aligned, middle aligned, or right aligned), and the table is mostly full (e.g., only a few rows are missing a few values).

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an illustration of an example electronic document according to the present disclosure.

FIG. 5 illustrates a result of a table detection step of the data extraction method according to the present disclosure as applied to the example electronic document page of FIG. 3.

DETAILED DESCRIPTION

The present disclosure describes computer implemented techniques for extracting data from electronic documents, such as scanned documents that contain or include tabular data. In some aspects, data extraction methods according to the present disclosure include performing an optical character recognition (OCR) on the pages of the electronic document to recognize alphanumeric text; determining a type and layout of the each page in order to detect any tables located on the pages, extracting the recognized text from the tables, and generating an output file (e.g., a comma separated value file) that includes the extracted data.

Figure 1:
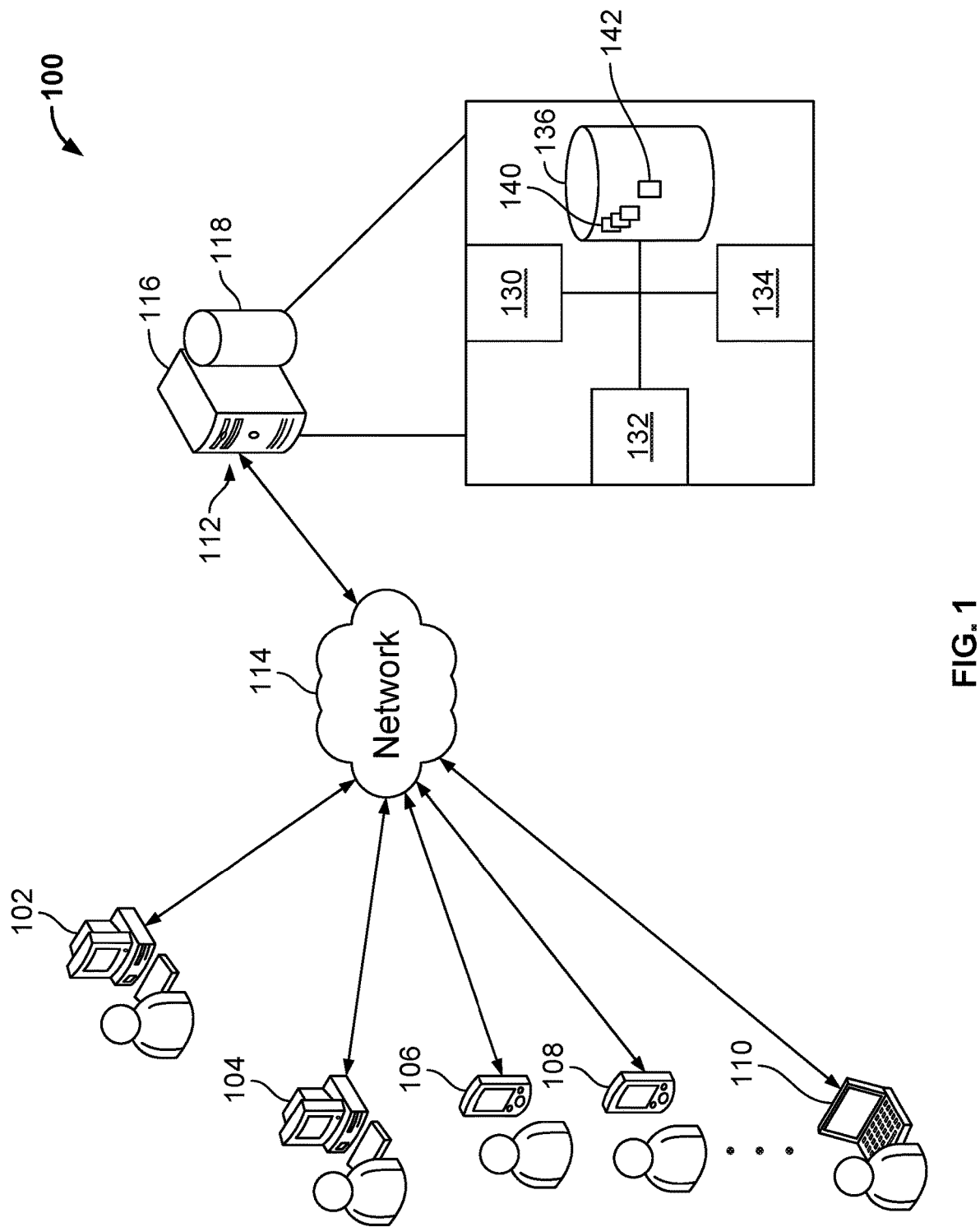
FIG. 1 illustrates an example distributed network architecture that includes one or more client devices and one or more server devices that execute data extraction solver according to the present disclosure.

FIG. 1 illustrates an example distributed network architecture 100 that includes one or more client devices and one or more server devices that execute a data extraction solver through a data extraction service. The network architecture 100 includes a number of client devices 102, 104, 106, 108, 110 communicably connected to a structured data processing server system 112 ("server system 112") by a network 114. The server system 112 includes a server device 116 and a data store 118. The server device 116 executes computer instructions (e.g., all or a part of a data extraction solver) stored in the data store 118 to perform the functions of the data extraction service. For example, in some aspects, the data extraction service may be a subscription service available to the client devices 102, 104, 106, 108, and 110 (and other client devices) by an owner or operator of the server system 112. In some aspects, the server system 112 may be owned or operated by a third party (e.g., a collocation server system) that hosts the data extraction service for the owner or operator of the data extraction service.

Users of the client devices 102, 104, 106, 108, 110 access the server device 112 to participate in the data extraction service. For example, the client devices 102, 104, 106, 108, 110 can execute web browser applications that can be used to access the data extraction service. In another example, the client devices 102, 104, 106, 108, 110 can execute software applications that are specific to the data extraction service (e.g., as "apps" running on smartphones). In other words, all of the data extraction service may be hosted and executed on the server system 112. Or in alternative aspects, a portion of the data extraction service may execute on the client devices 102, 104, 106, 108, and 110 (e.g., to receive and transmit information entered by a user of such client devices and/or to display output data from the data extraction service to the user).

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

As illustrated in FIG. 1, the server system 112 (e.g., the server device 116 and data store 118) includes one or more processing devices 132, the data extraction solver 130, one or more memory modules 136, and an interface 134. Generally, each of the components of the server system 112 are communicably coupled such that the one or more processing devices 132 may execute the data extraction solver 130 and access and manipulate data stored in the one or more memory modules 136. Data to be output from the server system 112, or data to be input to the server system 112, may be facilitated with the interface 134 that communicably couples the server system 112 to the network 114.

As illustrated in this example, the one or more memory modules 136 may store or reference one or more electronic documents 140. Each of the electronic documents 140 may comprise or be a digital image of a paper document, such as, for example, a directional survey for a petroleum or water well. For example, a directional survey may contain tabular data associated with trajectories for a directional drilled wellbore from which hydrocarbons or water may be produced.

As shown, the one or more memory modules 136 may store other portions of data that are determined or produced during execution of the data extraction solver 130 to, e.g., produce extracted data from the electronic documents 140. For example, OCR'd data 142 that may be generated during the execution of method 200 as described with reference to FIG. 2 may be stored (at least transiently). Other data, either calculated or determined, generated by execution of the data extraction solver 130 (as described, for example, with reference to FIG. 2) may also be stored (even if transiently) in the one or more memory modules 136.

Implementations of a data extraction method by a data extraction solver described in the present disclosure may be performed on a variety of different electronic documents. In some aspects, the data extraction method may be performed on electronic documents (e.g., scanned images) that contain data (e.g., alphanumeric data) contained in one or more tables (e.g., columns and rows of data) within the electronic document. One such example document may be a well file document, which often includes directional surveys that contain tabular data associated with trajectories for a directional drilled wellbore from which hydrocarbons may be produced. An example of a page of an electronic well file document, and specifically, a directional survey page of the document, is shown in FIG. 3. As shown in FIG. 3, the directional survey is comprised of tabular well path data in which measured depth (MD, ft.), inclination (degrees), azimuth (degrees), true vertical depth (TVD, ft.), and other data regarding the well path is contained in a two-dimensional (rows and columns) table. Other electronic documents, including electronic documents from industries other than hydrocarbon wellbore drilling, completion, or production, may also be subject to the data extraction method described herein.

Figure 2:
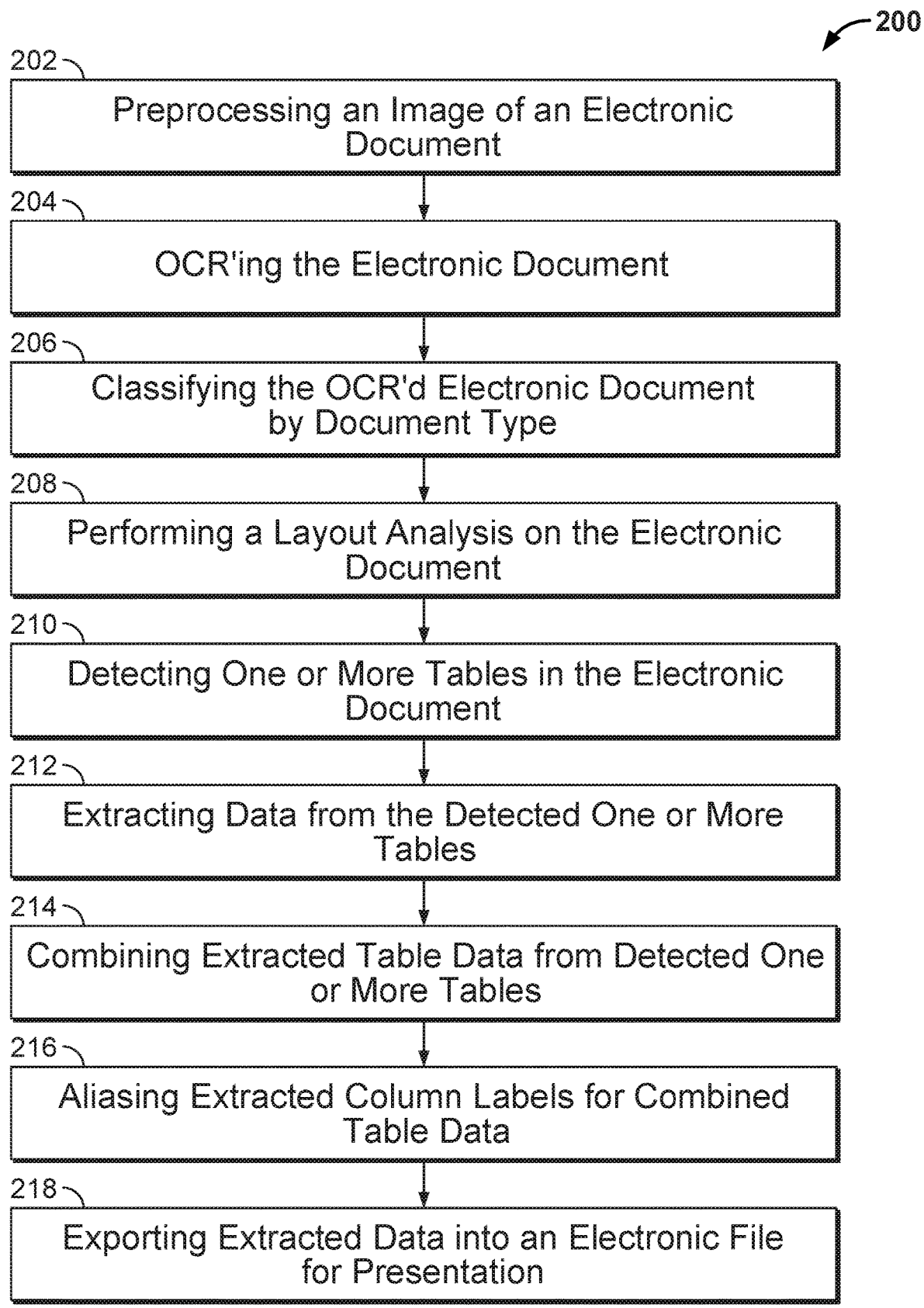
FIG. 2 is a flowchart that describes an example method executed by the data extraction solver of FIG. 1.

FIG. 2 is a flowchart that describes an example method 200 executed by the data extraction solver of FIG. 1. Method 200, therefore, represents an example implementation of a data extraction method according to the present disclosure. Method 200 may begin at step 202, which includes preprocessing an image of an electronic document (e.g., a scanned image of a paper document such as a directional survey of a well). The image preprocessing step, in some aspects, applies minor image manipulations that, combined, may increase the quality of the optical character recognition and table output. For example, page(s) of the electronic document are rotated by using Tesseract OCR's orientation and script detection (OSD) mode to determine how the image is rotated. The OSD mode of Tesseract produces a text file containing the rotation of the image, in increments of 90 degrees. This text file is parsed after its creation to determine whether to apply rotation to the page image.

In some aspects, once the image is rotated, gray pixels may be converted to whitespace as opposed to applying a threshold. In the example electronic document 300 of FIG. 3, for instance, the images are produced either by scanning (at which point an automatic threshold is applied to the image) or by digital conversion (where the document design is preserved). Thus, if a document image contains gray pixels, these are graphic elements from digitally converted page images that are not important to the information we attempt to extract.

In some aspects, further preprocessing may be performed in the image preprocessing step 202. For example, horizontal and vertical lines may be removed. In the example electronic document 300 of FIG. 3, which is a well file document with a directional survey, a presence of table lines, along with the general style and layout of the page, may be dependent on the original creator that is responsible for producing the data (e.g., in this example, a well operator), and therefore may be an unreliable means of detecting table regions. Further, there may be significant increases in the accuracy of the Tesseract OCR result when lines are removed from images with table lines. To find table lines, for instance, closing morphological transformation from OpenCV using horizontal and vertical kernels may be used in the preprocessing step. This may result in an image containing only lines, which is then used to convert black lines to whitespace in the original image of the electronic document.

In some aspects of the data extraction method, it may be assumed that the image is free of skew. In alternative aspects, a skew detection and removal methodology (not unlike those mentioned in Cattoni et al 1998, and O'Gorman, Kasturi 1997) may be implemented in the preprocessing step as well.

Method 200 may continue at step 204, which includes OCR'ing the electronic document (which may or may not be preprocessed as described). For example, in some aspects, the Tesseract OCR may be used to produce a hypertext markup language (html) representation of the page text (e.g., from the image in FIG. 3). From the html data, information about every text item's bounding rectangle may be parsed/saved in a JSON format (e.g., similar to the output of Google Vision).

Method 200 may continue at step 206, which includes classifying the OCR'd electronic document by document type, e.g., on a page-by-page basis of the document. This is contrary to a manual extraction process, in which a user identifies, e.g., directional survey pages in a well file PDF document by looking at the page image thumbnails. From the thumbnails, the user can spot the tabular format on a page with mostly numeric data, and common keywords that are typical of a directional survey page (or different key words for different types of documents).

In step 206 of the data extraction method 200, an automated page classification system may use a support vector machine (SVM) classifier to assign a binary label to every page based on whether it meets a particular criteria or not. In this example of the electronic document of FIG. 3, the binary label is assigned based on the SVM determination of whether or not the page is or contains a particular type of tabular data (e.g., a directional survey).

In some aspects, the SVM classifier assigns this binary label to a feature vector representing: 1) ratio of numeric content to alphabetical content, 2) ratio of numeric content to the length of the page text, and 3) number of directional-survey-specific keywords. The SVM model can be trained on electronic documents that do meet the binary criteria, such as directional survey pages, as well as documents that do not meet the binary criteria, such as well file pages that do not include directional survey data. In some cases, during training of the SVM, there may be false positives (e.g., the SVM incorrectly determines that the page did meet the binary criteria) and false negatives (e.g., the SVM incorrectly determines that the page did not meet the criteria). In the example electronic document of a well file with directional survey data (i.e., electronic document 300), the false positive cases could include pages with table data not related to directional surveys, or plat maps containing tables of numeric data. In these examples, the fact that the images contained tables is circumstantial; the classifier essentially looks for predominantly numeric content, or numeric content with the inclusion of certain keywords. The false negative examples could include directional survey pages that contain only one row of data, either at the start or end of the directional survey (which span multiple pages), and usually contain mostly alphabetical attribute data pertaining to the well. To solve the false negative problem, for every identified directional survey page, the data extraction method of the present disclosure can automatically classify the page before and after as also being directional surveys. For our process, it is acceptable to be over-inclusive, but unacceptable to miss pages.

Method 200 may continue at step 208, which includes performing a layout analysis on the electronic document. For example, for the purposes of finding table regions in document form images, the layout analysis may calculate text segmentation for whole-word (or numeric-entry) values on the page. In the example of directional survey pages of electronic document 300, such electronic document pages may be form-type documents that can have a variety of layouts depending on the well operator or directional drilling company that produced them, but they rarely contain blocks of text or text columns. With black lines and gray middle ground regions removed from the image, the layout analysis uses whitespace to identify the horizontal and vertical bounding areas for whole word values.

Figure 4:
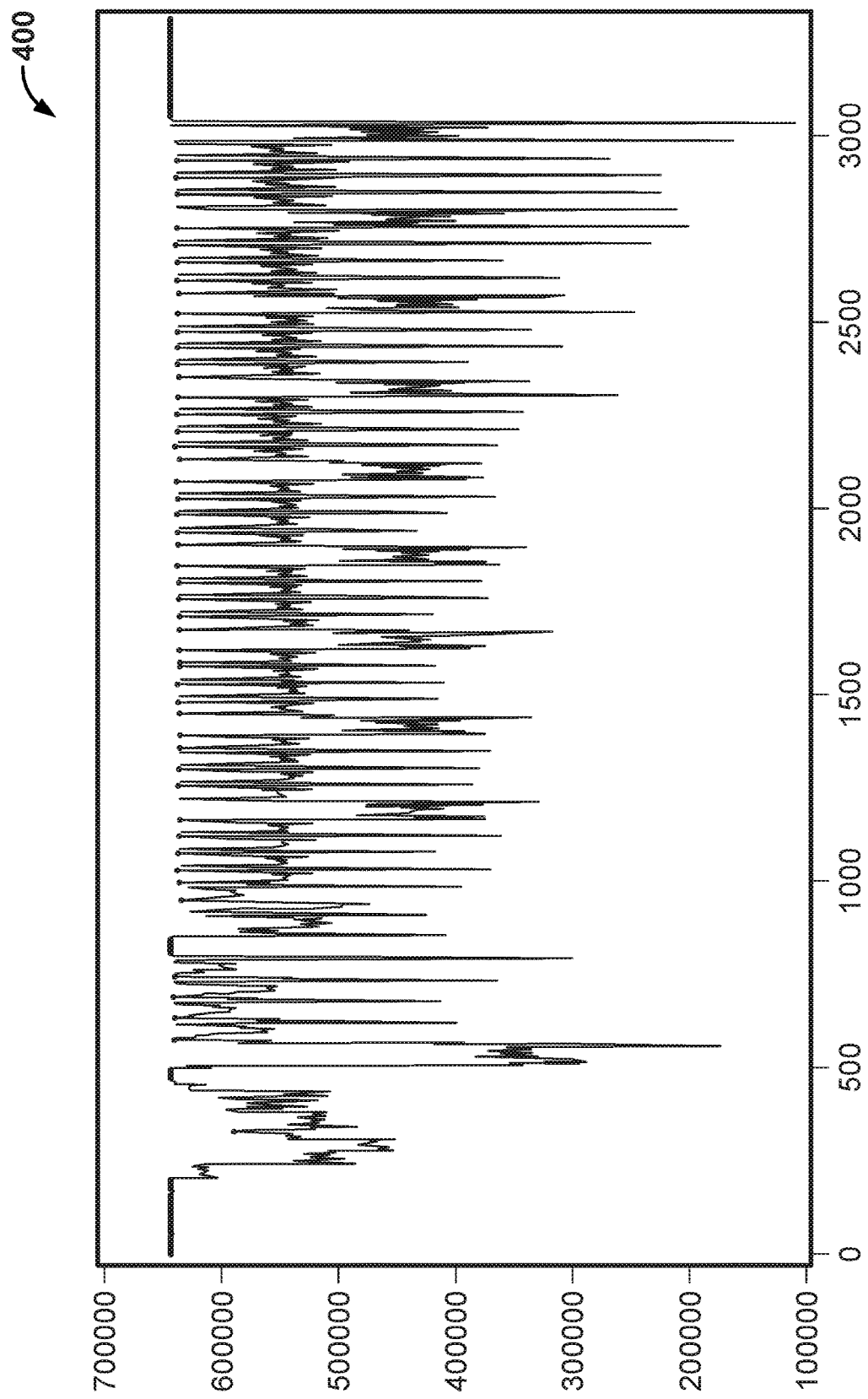
FIG. 4 is a graph that represents pixel row sums and identified horizontal whitespace after a layout analysis step of a data extraction method according to the present disclosure.

For segmentation of whole-word values, horizontal text rows may first be identified, and then vertical bounds for each identified text row may be identified. For text row identification, the projection profile of pixel row sums may be used to find local maximum values, thus indicating pixel rows representing horizontal bounding whitespace. FIG. 4 shows a graph 400 that represents pixel row sums and identified horizontal whitespace. The graph 400 represents the pixel row sums from top of the electronic document page (left) to bottom of the electronic document page (right). The stars on the graph 400 represent regions of bounding whitespace.

Local maximum values may be found using a greater-than-or-equal-to comparison, so that all contiguous horizontal whitespace boundaries are identified. In electronic documents where the text is a standard size (such as is the case in directional survey pages), the size may be approximately ten to twelve point font. Text rows may be found by comparing the pixel height of the area between every two horizontal whitespace boundaries to the estimated height of six point font.

In some examples, such as well files, the electronic document pages are letter size (e.g., 8.5 inches wide by 11 inches tall). To calculate the pixel height of six point font, the pixel per inch resolution is calculated by dividing the longest side's pixel dimension by 11 (with the assumption that the page is a standard size). This value is multiplied by six and divided by 72 (points per inch) to determine the pixel height of 6 point font.

Once text rows are identified, each row is evaluated separately to find vertically bounding whitespace regions. Vertical whitespace boundaries can be easily identified using the projection profile of pixel column means for every text row region. Using this method results in vertical whitespace boundaries for every character, rather than the whole-word values. Instead of applying a morphological transformation to the row image to form word blobs, binning and thresholding of the projection profile values may be used to effectively horizontally blur the characters together.

The bin size may be determined by dividing the horizontal pixel dimension of the image by a tuned parameter (e.g., 150). This parameter may be tuned to find an appropriate value that works in all situations for different resolutions, but translates to the approximate pixel height of a particular font size that is appropriate for the type of electronic document (e.g., in the case of directional surveys, 4-5 point font). This bin size may be generally larger than the kerning of standard font sizes, which means letters in the projection profile get blurred together. Each bin of pixel column means is averaged to produce a new, simplified projection profile.

The values for this new projection profile may be subsequently binarized using a particular threshold (e.g., 240). In a black and white 8-bit image with black text and white background, black pixels have a value of 0 while white pixels have a value of 255. Applying a threshold of 240 means that any slightly gray bin means get assigned a value of 0, while everything else is assigned a value of 1. This new row projection profile may be easier to process; finding blocks of vertically bounding whitespace is a matter of selecting all bins assigned a 1, and, conversely, choosing bins with values of 0 represent row text values.

With the text value bins identified for every row, the result is a set of bounding rectangles for every text value on the page image. These text bounding rectangles are organized by row, and assigned a logical identification (ID) that is a concatenation of row index (starting with 0 at the top) and value index (starting at 0 from left to right).

Method 200 may continue at step 210, which includes detecting one or more tables within the electronic document. For example, in numeric data tables in some electronic documents, individual numeric entries are vertically aligned on their right boundaries with other numeric entries on the page, as has been the norm for displaying columns of numeric data for many years. Table entries, likewise, have neighboring values that are also vertically aligned on their right boundaries with other values. These table values on the same line should agree on their vertical alignment association with other text rows. For example, given a numeric data table with rows A, B, and C, and columns 0, 1, 2, A0 and A1 should agree on their alignments with values on rows B and C.

With this basic table model in mind, the logic to identify table candidates includes finding vertical associations and then finding horizontal associations. In some aspects, the data extraction method may include the following algorithm for finding vertical associations:

For every row text value:
    Find vertical alignment associations with other rows
    Add the IDs of vertically aligned values to a list
    Save the vertical association list to a dictionary with the row text value ID as the key Once all the alignments are found, vertical row associations are compared between neighboring row values. If two neighboring row values share vertical row associations in common, their IDs are added to their respective association lists in the dictionary. The references to other-row associations for every value in a text row are then counted. In some aspects, seventy percent of the row members must agree on a vertical row association for it to be considered "valid." The seventy percent parameter is rounded up from two-thirds to be slightly more restrictive. For example, in the example of the well file with directional survey table data, the survey tables contain ten or more columns. Since the population of a row is compared to the counts of other-row references, the value for seventy percent of a row population is converted to an integer before comparison. Thus, for a table with ten columns, seventy percent is one integer more restrictive than two-thirds.

Using the seventy percent agreement rule for vertical associations, the vertical associations for each row value are adjusted. Once all the vertical and horizontal associations are identified, connected component logic is used to find the extent of the table region of the image. Using connected graph logic, any set of connected values that span multiple rows is flagged as a table.

Figure 5:
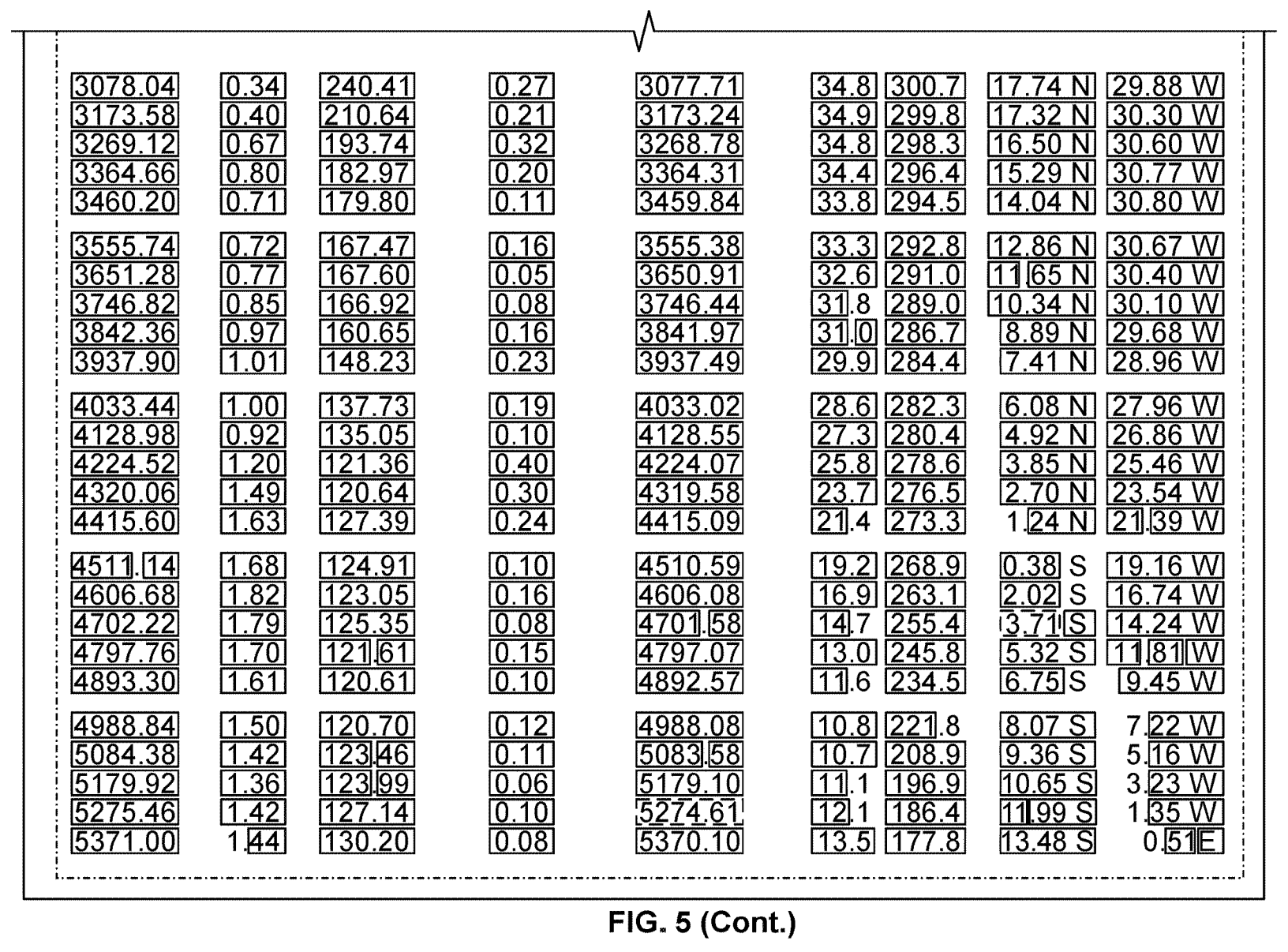

FIG. 5 illustrates the result 500 of the table detection step as applied to the example electronic document 300 page of FIG. 3. The light gray boxes are for all text items identified by the layout analysis, the dark gray boxes represent possible table candidates based on their vertical alignment with other values, and the box that encloses the tabular data represents the connected table region.

Method 200 may continue at step 212, which includes extracting data from the detected one or more tables. For example, once the bounding rectangle information for the table region is identified, the table region is cropped out of the image. With all vertical and horizontal lines removed from the image, the bounding area for columns may be identified by looking for vertical whitespace boundaries in the new table region image. This is done by calculating the pixel column means and subsequently binning the means using the same methodology used for finding vertical boundaries in text rows. From these binned values, contiguous blocks of vertical whitespace are identified. The midpoint of every contiguous vertical whitespace area may be taken to be a column boundary.

In some aspects, the column boundaries are combined with the identified text row boundaries to produce cell value bounding boxes for the identified table. These table cell bounding rectangles may be stored in a dictionary where they are assigned a label by row and column. Rows may be labeled using alphabetical characters in order from A to Z, and AA to ZZ. Columns may be labeled using integer values starting at 0 for the first column and increasing to the right.

At this point the table in the image has been detected and organized, but no data has been extracted from the OCR output. In the example implementation, a cell value parser iterates through the table cells, checking the OCR output for text bounding boxes that fall inside the cell region. When an OCR text value is found to lie inside the table cell region, the text value is added to the table cell dictionary and removed from the OCR dictionary.

In some aspects, subsequent to step 212, as the text output from OCR is organized based on its row and column position within the image's table region, the text is parsed to convert commas and spaces to periods. For a cell value like "10,000.00" this would result in a new string such as "10.000.00." The string is then corrected to remove extra decimal points based on the number of numeric characters that follow the last decimal. This result, then, would look like "10000.00." This sub-step of step 212 is performed, in some examples, to resolve issues with the OCR content that occur frequently, where instead of a comma there is a space (e.g., "10 000.00") or a decimal point is wrongly interpreted by OCR to be a comma (e.g., "10,000.00" is interpreted as "10,000,00"). This sub-step, therefore, may account for any combination of these issues, so a value like "1 0, 00 0, 00" will be converted to "10000.00."

In still further aspects of step 212, subsequent to the sub-step described in the previous paragraph, the cell value text may then be converted to a floating point number. If this conversion fails (e.g., an indication the OCR output contains "noise" or characters that do not appear in the image), the cell region may be cropped out of the image and run through OCR on its own. This re-OCR step may limit the effect of pixel noise in the image by isolating the table cell text, and improves the recognition accuracy of Tesseract. The new text that is identified is then parsed, as in the previous sub-step, and converted to a floating point number. If, at this point, this conversion fails, the text content may be removed, to be entered later by a data entry technician (e.g., human entry).

In some examples, additional processing steps subsequent to step 212 may occur. For example, in some aspects, once the sub-steps of step 212 are completed for every table cell, the data extractor solver may look for table column labels. For electronic documents that are directional surveys, for example, there may be a small number of keywords used to label the columns. Starting at the top of the table region, fuzzy matching (e.g., the Monge-Elkan algorithm for comparing lists of words to one another) may identify the text rows above the table region that represent the table columns. The fuzzy matching process may be used to score rows around the top of the data table region; the high-scoring row is used as the primary column label row. The text rows starting at the high-scoring text row to the text row directly above the table region may be assumed to be the table column labels.

The text for the column label rows may then be extracted using a similar methodology to the table extraction; bounding whitespace regions are identified as the text column boundaries, and the OCR text is then sorted by column. The sorted text is then associated with the table columns based on the amount of overlap in the horizontal extents of the table column region and the column label region. Once the column label text is associated with the data columns, the text is added to the table object (which stores the relative position information of all the parsed OCR text). The table object may be used to convert the data to, for example, a comma separated values (CSV) file as described in the next step.

Method 200 may continue at step 214, which includes combining extracted table data from detected one or more tables. In some aspects, electronic documents span multiple pages. For example, within a well file, a directional survey pages (and corresponding data) often spans multiple pages. Method 200 may be executed to extract such data for each page individually. Once the entire well file document has had OCR performed (step 204), and every directional survey page extracted (step 212), contiguous directional survey page tables may be combined into a single, larger directional survey table.

In some aspects, the combining of table pages may be executed by first determining whether tables on different pages are associated. Tables on separate pages are deemed to be associated, for example, if the horizontal extent of the entire table region for both tables overlap to a degree greater than a threshold percentage (e.g., 95%). In addition, the horizontal extents of each data column must also overlap greater than the threshold percentage (e.g., 95%), and the number of cross-table column associations must be greater than another threshold percentage (e.g., 80%) of the number of columns in each table. This last requirement accounts for situations where a column is incorrectly identified in one table but not another (image artifacts that extend vertically along the page can sometimes be misinterpreted as a table column, but get dropped when combined).

In some aspects, once two tables on separate pages are found to be associated, the rows of the second table may be appended to the first table. In addition, the column label text for both tables may be added to a list. For example, for directional survey data, for two tables, the Measured Depth field might have column label text like [[Measured, Depth], [Measured, Depth]]. Subsequent contiguous page tables may be appended onto the first table until there is a page break.

Method 200 may continue at step 216, which includes aliasing extracted column labels for combined table data. For example, after the combining of tables on separate pages, the column labels may be aliased, e.g., for the ease of ingestion into one or more databases. For directional survey data, for example, there may be specific column label aliases: Measured Depth (MD), Inclination (INCL), Azimuth (AZI), and Total Vertical Depth (TVD). To alias the column labels, in some aspects, a decision tree classifier trained on extracted OCR text for each of the different columns may be executed. The decision tree classifier assigns one of five labels: one label for each of the required columns (MD, INCL, AZI, TVD) and one catch-all label for every other column label.

In some aspects, to classify the column label, the column label text is first converted into a feature vector, where every feature represents an expected keyword in the column label region of a directional survey. This feature vector is specific to directional survey tables. The feature vector, in some examples, is similar to a sparse one-hot feature vector, where every feature is represented as a 1 or 0 based on whether it appears in the text or not. In this case, a normalized edit distance of the input word may be used to serve as the value for the feature.

Taking the example of Measured Depth (MD), the edit distance for the word "Measured" may be calculated for every keyword in the feature vector. The highest scoring edit distance is a 1.0 at the feature "Measured." In the feature vector, (which starts as an array of zeros [0,0,0,0,0 . . . ]), a 1.0 is set as the value for the feature "Measured" ([1.0, 0, 0 , 0, 0 . . . ]). The same process is repeated for "Depth"; the resulting feature vector in this case may appear as [1.0, 1.0, 0, 0, 0, 0, 0 . . . ], where the first two features are the words "Measured" and "Depth".

In this feature vector, edit distance (instead of a basic one-hot feature vector) may be used to help account for situations where OCR results in a misspelled keyword. In these cases, "Measured Depth" might be slightly misspelled, so the feature vector might look like [0.7, 0.6, 0, 0, 0, 0 . . . ] instead. This may still be enough information for the decision tree classifier to label the text content.

At the end of the table combining step, in addition to the combined tables, the data extraction solver may store the column label for each column, for each page. For an overlapping column, the text found on each page may be classified separately. Once the overlapping column labels are each classified separately, the most common or the highest scoring label may be chosen as the alias for that combined column. For example: in a combined column, there may be column label text [["Measured", "Depth"], ["Measured", "Depth"], ["Madgfljag", "Dwegpt"]. The classifier labels these as [MD, MD, Unknown] respectively. The most common label is MD, thus MD (Measured Depth) is applied to the unknown column.

In a situation where there are only two tables combined, with two column labels to classify, the highest scoring label may be used. The score in this case is meant as the probability of the label accuracy being correct (e.g., based on the training data). After the aliases are derived, they may be applied to the combined tables. A separate process finds the tables with the four required columns and loads them to a database, where they are further processed before being presentable to users as in step 214.

Method 200 may continue at step 218, which includes exporting the extracted data into an electronic file for presentation to a user, storage, conversion to hardcopy (e.g., printing) or otherwise). For example, once text has been identified for every cell value region, the cell boundary dictionary may be converted to a Pandas dataframe, and exported as a CSV file.

Figure 6:
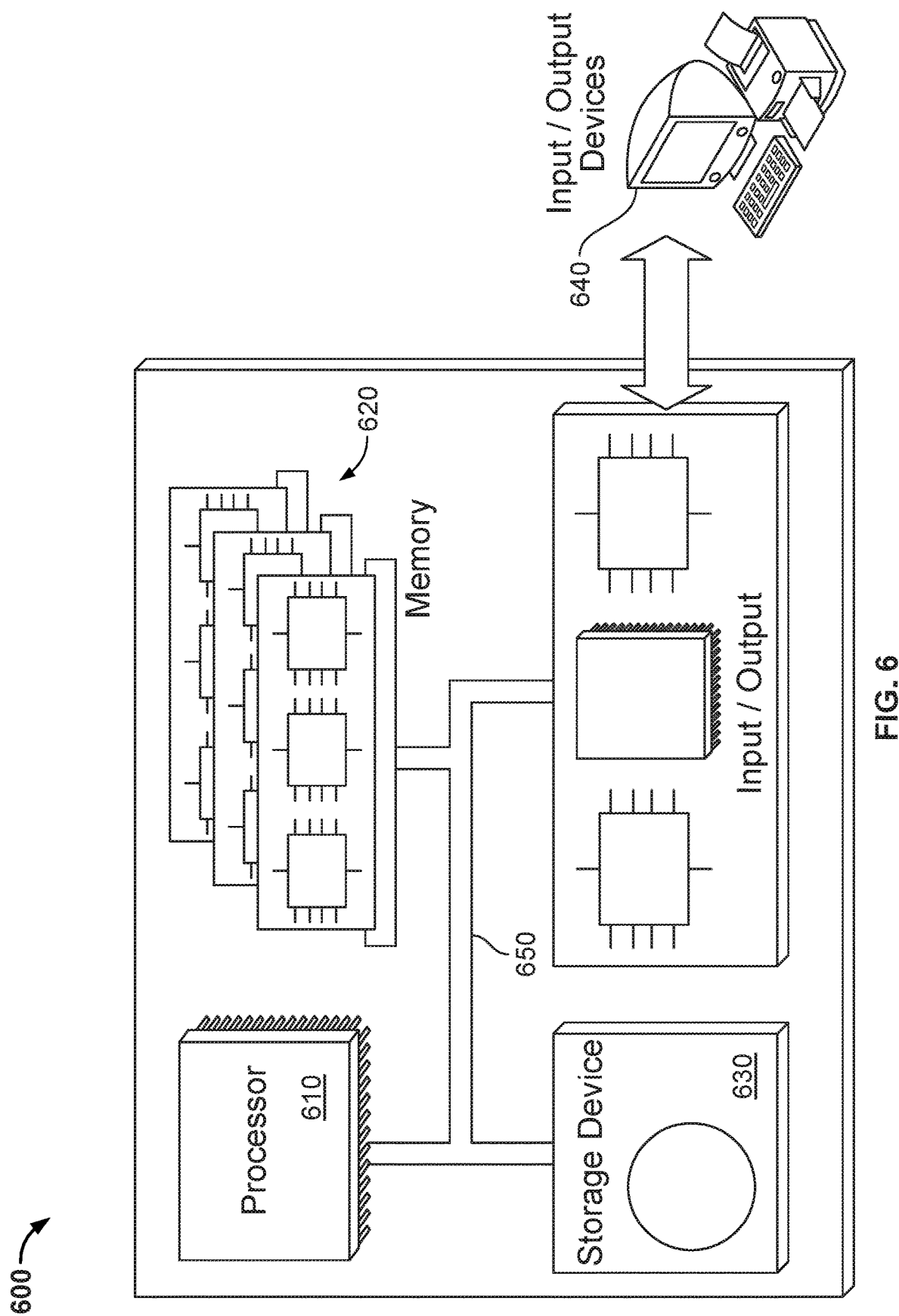
FIG. 6 is a schematic illustration of an example computing system for a computer-implemented method for extracting data from an electronic document according to the present disclosure.

FIG. 6 is a schematic illustration of an example computing system 600 that may implement, all or in part, the data extraction method according to the present disclosure. The computing system 600 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The computing system 600 includes a processor 610, a memory 620, a storage device 630, and an input/output device 640. Each of the components 610, 620, 630, and 640 are interconnected using a system bus 650. The processor 610 is capable of processing instructions for execution within the computing system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the computing system 600. In one implementation, the storage device 630 is a computer-readable medium. In various different implementations, the storage device 630 may be a floppy disk device, a hard disk device, an optical disk device, or a tape device.

The input/output device 640 provides input/output operations for the computing system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for extracting data from an electronic document, comprising:
    identifying, with at least one hardware processor, an electronic document that comprises a page;
    performing, with the hardware processor, an optical character recognition (OCR) on the page to determine a plurality of alphanumeric text strings on the page;
    determining, with the hardware processor, a type of the page, where determining the type of the page comprises assigning, with a support vector machine (SVM) classifier, a binary label to the page based on a specified criteria, and assigning, with the SVM classifier, the binary label to the page based on the specified criteria comprises assigning, with the SVM classifier, the binary label to a feature vector that represents at least one of:
        a ratio of numeric content to alphabetical content on the page,
        a ratio of numeric content to the length of the text on the page, or a number of specified keywords;
    determining, with the hardware processor, a layout of the page;
    determining, with the hardware processor, at least one table on the page based at least in part on the determined type of the page and the determined layout of the page;
    extracting, with the hardware processor, a plurality of data from the determined table on the page; and
    generating, with the hardware processor, an output file that comprises the plurality of data.

2. A structured data processing system for extracting data from an electronic document, the system comprising:
    one or more hardware processors;
    a memory in communication with the one or more hardware processors, the memory storing a data structure and an execution environment, the data structure comprising an electronic document, the execution environment comprising:
        a data extraction solver configured to perform operations comprising:
            identifying a page of the electronic document;
            performing an optical character recognition (OCR) on the page to determine a plurality of alphanumeric text strings on the page;
            determining a type of the page, where determining the type of the page comprises assigning, with a support vector machine (SVM) classifier, a binary label to the page based on a specified criteria, and assigning, with the SVM classifier, the binary label to the page based on the specified criteria comprises assigning, with the SVM classifier, the binary label to a feature vector that represents at least one of:
                a ratio of numeric content to alphabetical content on the page,
                a ratio of numeric content to the length of the text on the page, or
                a number of specified keywords;
            determining a layout of the page;
            determining at least one table on the page based at least in part on the determined type of the page and the determined layout of the page; and
            extracting a plurality of data from the determined table on the page;
        a user interface module that generates a user interface that renders one or more graphical representations of the extracted data; and
        a transmission module that transmits, over one or more communication protocols and to a remote computing device, data that represents the one or more graphical representations.

3. The structured data processing system of claim 2, wherein the data extraction solver is configured to perform operations further comprising prior to performing the OCR on the page, performing an image preprocess on the page.

4. The structured data processing system of claim 3, wherein the operation of performing the image preprocess comprises determining a rotation of the at least one page.

5. The structured data processing system of claim 4, wherein the operation of determining the rotation of the at least one page comprises parsing a text file generated by the OCR to determine whether to apply rotation to the at least one page.

6. The structured data processing system of claim 3, wherein the operation of performing the image preprocess comprises rotating the page.

7. The structured data processing system of claim 6, wherein the operation of rotating the page comprises rotating the page in increments of 90 degrees.

8. The structured data processing system of claim 3, wherein the operation of performing the image preprocess comprises converting gray pixels on the page to whitespace.

9. The structured data processing system of claim 3, wherein the operation of performing the image preprocess comprises removing horizontal and vertical lines on the page.

10. The structured data processing system of claim 9, wherein the data extraction solver is configured to perform operations further comprising determining the horizontal and vertical lines with a closing morphological transformation using horizontal and vertical kernels.

11. The structured data processing system of claim 3, wherein the operation of performing the image preprocess comprises determining a skew of the page.

12. The structured data processing system of claim 11, wherein the data extraction solver is configured to perform operations further comprising, based on the skew determination, manipulating the page to remove or reduce the skew.

13. The structured data processing system of claim 2, wherein the operation of performing the OCR comprises producing a hypertext markup language representation of the plurality of alphanumeric text strings.

14. The structured data processing system of claim 13, wherein the data extraction solver is configured to perform operations further comprising: determining a bounding rectangle for each of the plurality of alphanumeric text strings; and saving information about each of the determined bounding rectangle in a JavaScript Object Notation (JSON) format.

15. The structured data processing system of claim 2, wherein the specified criteria comprises the page including a table.

16. The structured data processing system of claim 2 wherein the data extraction solver is configured to perform operations further comprising training the SVM classifier on a plurality of electronic training documents, where at least a portion of the plurality of electronic training documents meet the specified criteria, and at least another portion of the plurality of electronic training documents do not meet the specified criteria.

17. The structured data processing system of claim 2, wherein the data extraction solver is configured to perform operations further comprising, based on the page being assigned the binary label, automatically assigning the binary label to another page immediately preceding the page in the electronic document.

18. The structured data processing system of claim 2, wherein the data extraction solver is configured to perform operations further comprising, based on the page being assigned the binary label, automatically assigning the binary label to another page immediately following the page in the electronic document.

19. The structured data processing system of claim 2, wherein the operation of determining the layout of the page comprises calculating text segmentation for the plurality of alphanumeric text strings on the page.

20. The structured data processing system of claim 19, wherein the operation of calculating the text segmentation comprises identifying, based on whitespace on the page, a horizontal and vertical bounding area for each of the plurality of alphanumeric text strings.

21. The structured data processing system of claim 20, wherein the operation of identifying the horizontal bounding areas comprises identifying horizontal text rows by:
    determining a projection profile of pixel row sums;
    determining, based on the projection profile, local maximum values of the pixel row sums; and
    determining the horizontal bounding areas based on the determined local maximum values of the pixel row sums.

22. The structured data processing system of claim 21, wherein the operation of identifying the vertical bounding area comprises comparing a pixel height of an area between adjacent horizontal bounding areas to an estimated height of specified font of the plurality of alphanumeric text strings.

23. The structured data processing system of claim 22, wherein the data extraction solver is configured to perform operations further comprising calculating the estimated height based at least in part on a height and a width of the page.

24. The structured data processing system of claim 21, wherein the operation of identifying the vertical bounding area further comprises determining a projection profile of pixel column means for each determined horizontal bounding area.

25. The structured data processing system of claim 21, wherein the data extraction solver is configured to perform operations further comprising:
    determining bounding rectangle for each of the plurality of alphanumeric text strings based on the determined horizontal and vertical bounding areas; and
    assigning a unique identification (ID) to each of the plurality of bounding rectangles, where each unique ID comprises a concatenation of row index and value index.

26. The structured data processing system of claim 2, wherein the operation of determining the at least one table on the page based at least in part on the determined type of the page and the determined layout of the page comprises determining vertical associations and horizontal associations.

27. The structured data processing system of claim 26, wherein the operation of determining the vertical associations comprises:
    for each alphanumeric text string in a particular horizontal text row:
        determining whether the alphanumeric text string is vertically aligned with one or more alphanumeric text strings in other horizontal text rows;
        adding a row text value identification (ID) of any vertically aligned alphanumeric text string to a list; and
        saving the list to a dictionary with the row text value ID as a key to the dictionary.

28. The structured data processing system of claim 27, wherein the data extraction solver is configured to perform operations further comprising:
- comparing the determined vertical associations between adjacent horizontal associations; and
- based on adjacent horizontal associations having a shared, common vertical association, adding: an identification of the adjacent horizontal association to a horizontal association list in the dictionary, and an identification of the shared, common vertical association to a vertical association list in the dictionary.

29. The structured data processing system of claim 2, wherein the operation of extracting the plurality of data from the determined table on the page comprises cropping a table region of the determined table from the page.

30. The structured data processing system of claim 29, wherein the data extraction solver is configured to perform operations further comprising:
- iterating a cell value parser through bounding rectangles, for each iteration:
  - checking the OCR output for at least one alphanumeric text string that falls within one of the bounding rectangles; and
  - based on at least one alphanumeric text string falling within one of the bounding rectangles, adding the alphanumeric text string to a table cell dictionary and removing the alphanumeric text string from an OCR dictionary.

31. The structured data processing system of claim 2, wherein the data extraction solver is configured to perform operations further comprising:
- combining the extracted plurality of data from the determined table on the page with extracted data from another determined table on another page; and
- aliasing extracted column labels associated with the combined extracted data from the determined tables of the pages.

32. The structured data processing system of claim 2, wherein the electronic document comprises a well file.

33. The structured data processing system of claim 32, wherein the table comprises a directional survey of the well file.

34. A structured data processing system for extracting data from an electronic document, the system comprising:
- one or more hardware processors;
- a memory in communication with the one or more hardware processors, the memory storing a data structure and an execution environment, the data structure comprising an electronic document, the execution environment comprising:
  - a data extraction solver configured to perform operations comprising:
    - identifying a page of the electronic document;
    - performing an optical character recognition (OCR) on the page to determine a plurality of alphanumeric text strings on the page;
    - determining a type of the page;
    - determining a layout of the page, where determining the layout of the page comprises calculating text segmentation for the plurality of alphanumeric text strings on the page, where the calculating comprises identifying, based on whitespace on the page, a horizontal and vertical bounding area for each of the plurality of alphanumeric text strings, and where the identifying comprises:
      - identifying horizontal text rows by determining a projection profile of pixel row sums, determining, based on the projection profile, local maximum values of the pixel row sums, and determining the horizontal bounding areas based on the determined local maximum values of the pixel row sums, and
      - identifying the vertical bounding area by comparing a pixel height of an area between adjacent horizontal bounding areas to an estimated height of specified font of the plurality of alphanumeric text strings;
    - determining at least one table on the page based at least in part on the determined type of the page and the determined layout of the page; and
    - extracting a plurality of data from the determined table on the page;
  - a user interface module that generates a user interface that renders one or more graphical representations of the extracted data; and
  - a transmission module that transmits, over one or more communication protocols and to a remote computing device, data that represents the one or more graphical representations.

35. The structured data processing system of claim 34, wherein the data extraction solver is configured to perform operations further comprising prior to performing the OCR on the page, performing an image preprocess on the page, where performing the image preprocess comprises determining a rotation of the page, and where determining the rotation of the page comprises parsing a text file generated by the OCR to determine whether to apply rotation to the page.

36. The structured data processing system of claim 35, wherein the operation of performing the image preprocess comprises removing horizontal and vertical lines on the page, and the data extraction solver is configured to perform operations further comprising determining the horizontal and vertical lines with a closing morphological transformation using horizontal and vertical kernels.

37. The structured data processing system of claim 35, wherein the operation of performing the image preprocess comprises determining a skew of the page, and the data extraction solver is configured to perform operations further comprising, based on the skew determination, manipulating the to remove or reduce the skew.

38. The structured data processing system of claim 34, wherein the electronic document comprises a well file, and the table comprises a directional survey of the well file.

39. A computer-implemented method for extracting data from an electronic document, comprising:
- identifying, with at least one hardware processor, a page of the electronic document;
- performing, with the hardware processor, an optical character recognition (OCR) on the page to determine a plurality of alphanumeric text strings on the page;
- determining, with the hardware processor, a type of the page;
- determining, with the hardware processor, a layout of the page, where determining the layout of the page comprises calculating text segmentation for the plurality of alphanumeric text strings on the page, where the calculating comprises identifying, based on whitespace on the page, a horizontal and vertical bounding area for each of the plurality of alphanumeric text strings, and where the identifying comprises:
  - identifying horizontal text rows by determining a projection profile of pixel row sums, determining, based on the projection profile, local maximum values of the pixel row sums, and determining the horizontal bounding areas based on the determined local maximum values of the pixel row sums, and identifying the vertical bounding area by comparing a pixel height of an area between adjacent horizontal bounding areas to an estimated height of specified font of the plurality of alphanumeric text strings;

determining, with the hardware processor, at least one table on the page based at least in part on the determined type of the page and the determined layout of the page;

extracting, with the hardware processor, a plurality of data from the determined table on the page; and generating, with the hardware processor, an output file that comprises the plurality of data.

40. The method of claim 39, further comprising prior to performing the OCR on the page, performing an image preprocess on the page, where performing the image preprocess comprises determining a rotation of the page, and where determining the rotation of the page comprises parsing a text file generated by the OCR to determine whether to apply rotation to the page.

41. The method of claim 40, wherein performing the image preprocess comprises removing horizontal and vertical lines on the page, the method further comprising determining the horizontal and vertical lines with a closing morphological transformation using horizontal and vertical kernels.

42. The method of claim 40, wherein performing the image preprocess comprises determining a skew of the page, the method further comprising, based on the skew determination, manipulating the page to remove or reduce the skew.

43. The method of claim 39, wherein the electronic document comprises a well file, and the table comprises a directional survey of the well file.

44. A structured data processing system for extracting data from an electronic document, the system comprising:
one or more hardware processors; a memory in communication with the one or more hardware processors, the memory storing a data structure and an execution environment, the data structure comprising an electronic document, the execution environment comprising:
a data extraction solver configured to perform operations comprising:
identifying a page of the electronic document;
performing an optical character recognition (OCR) on the page to determine a plurality of alphanumeric text strings on the page;
determining a type of the page;
determining a layout of the page;
determining at least one table on the page based at least in part on the determined type of the page and the determined layout of the page, where determining the at least one table on the page comprises determining vertical associations and horizontal associations, and where determining the vertical associations comprises, for each alphanumeric text string in a particular horizontal text row:
determining whether the alphanumeric text string is vertically aligned with one or more alphanumeric text strings in other horizontal text rows,
adding a row text value identification (ID) of any vertically aligned alphanumeric text string to a list, and
saving the list to a dictionary with the row text value ID as a key to the dictionary; and extracting a plurality of data from the determined table on the page;
a user interface module that generates a user interface that renders one or more graphical representations of the extracted data; and
a transmission module that transmits, over one or more communication protocols and to a remote computing device, data that represents the one or more graphical representations.

45. The structured data processing system of claim 44, wherein the data extraction solver is configured to perform operations further comprising prior to performing the OCR on the page, performing an image preprocess on the at least one page, where performing the image preprocess comprises determining a rotation of the page, and where determining the rotation of the page comprises parsing a text file generated by the OCR to determine whether to apply rotation to the page.

46. The structured data processing system of claim 45, wherein the operation of performing the image preprocess comprises removing horizontal and vertical lines on the page, and the data extraction solver is configured to perform operations further comprising determining the horizontal and vertical lines with a closing morphological transformation using horizontal and vertical kernels.

47. The structured data processing system of claim 45, wherein the operation of performing the image preprocess comprises determining a skew of the page, and the data extraction solver is configured to perform operations further comprising, based on the skew determination, manipulating the page to remove or reduce the skew.

48. The structured data processing system of claim 44, wherein the electronic document comprises a well file, and the table comprises a directional survey of the well file.

49. A computer-implemented method for extracting data from an electronic document, comprising:
identifying, with at least one hardware processor, a particular page of the electronic document;
performing, with the hardware processor, an optical character recognition (OCR) on the page to determine a plurality of alphanumeric text strings on the page;
determining, with the hardware processor, a type of the page;
determining, with the hardware processor, a layout of the page;
determining, with the hardware processor, at least one table on the page based at least in part on the determined type of the page and the determined layout of the page, where determining the at least one table on the page comprises determining vertical associations and horizontal associations, and where determining the vertical associations comprises, for each alphanumeric text string in a particular horizontal text row:
determining that the alphanumeric text string is vertically aligned with one or more alphanumeric text strings in other horizontal text rows,
adding a row text value identification (ID) of any vertically aligned alphanumeric text string to a list, and
saving the list to a dictionary with the row text value ID as a key to the dictionary;
extracting, with the hardware processor, a plurality of data from the determined table on the page; and
generating, with the hardware processor, an output file that comprises the plurality of data.

50. The method of claim 49, further comprising prior to performing the OCR on the page, performing an image preprocess on the at least one page, where performing the image preprocess comprises determining a rotation of the at least one page, and where determining the rotation of the at least one page comprises parsing a text file generated by the OCR to determine whether to apply rotation to the at least one page.

51. The method of claim 50, wherein performing the image preprocess comprises removing horizontal and vertical lines on the page, the method further comprising determining the horizontal and vertical lines with a closing morphological transformation using horizontal and vertical kernels.

52. The method of claim 50, wherein performing the image preprocess comprises determining a skew of the page, the method further comprising, based on the skew determination, manipulating the page to remove or reduce the skew.

53. The method of claim 49, wherein the electronic document comprises a well file, and the table comprises a directional survey of the well file.

54. A structured data processing system for extracting data from an electronic document, the system comprising:
one or more hardware processors;
a memory in communication with the one or more hardware processors, the memory storing a data structure and an execution environment, the data structure comprising an electronic document, the execution environment comprising:
a data extraction solver configured to perform operations comprising:
identifying a page of the electronic document;
performing an optical character recognition (OCR) on the page to determine a plurality of alphanumeric text strings on the page;
determining a type of the page;
determining a layout of the page;
determining at least one table on the page based at least in part on the determined type of the page and the determined layout of the page; and
extracting a plurality of data from the determined table on the page, where the extracting comprises cropping a table region of the detected table from the page;
iterating a cell value parser through bounding rectangles, for each iteration:
checking the OCR output for at least one alphanumeric text string that falls within one of the bounding rectangles, and
based on at least one alphanumeric text string falling within one of the bounding rectangles, adding the alphanumeric text string to a table cell dictionary and removing the alphanumeric text string from an OCR dictionary;
a user interface module that generates a user interface that renders one or more graphical representations of the extracted data; and
a transmission module that transmits, over one or more communication protocols and to a remote computing device, data that represents the one or more graphical representations.

55. The structured data processing system of claim 54, wherein the data extraction solver is configured to perform operations further comprising prior to performing the OCR on the page, performing an image preprocess on the page, where performing the image preprocess comprises determining a rotation of the page, and where determining the rotation of the page comprises parsing a text file generated by the OCR to determine whether to apply rotation to the page.

56. The structured data processing system of claim 55, wherein the operation of performing the image preprocess comprises removing horizontal and vertical lines on the page, and the data extraction solver is configured to perform operations further comprising determining the horizontal and vertical lines with a closing morphological transformation using horizontal and vertical kernels.

57. The structured data processing system of claim 55, wherein the operation of performing the image preprocess comprises determining a skew of the page, and the data extraction solver is configured to perform operations further comprising, based on the skew determination, manipulating the page to remove or reduce the skew.

58. The structured data processing system of claim 54, wherein the electronic document comprises a well file, and the table comprises a directional survey of the well file.

59. A computer-implemented method for extracting data from an electronic document, comprising:
identifying, with at least one hardware processor, a page of the electronic document;
performing, with the hardware processor, an optical character recognition (OCR) on the page to determine a plurality of alphanumeric text strings on the page;
determining, with the hardware processor, a type of the page;
determining, with the hardware processor, a layout of the page;
determining, with the hardware processor, at least one table on the page based at least in part on the determined type of the page and the determined layout of the page;
extracting, with the hardware processor, a plurality of data from the determined table on the page, where the extracting comprises cropping a table region of the determined table from the page;
iterating a cell value parser through bounding rectangles, for each iteration:
checking the OCR output for at least one alphanumeric text string that falls within one of the bounding rectangles, and
based on at least one alphanumeric text string falling within one of the bounding rectangles, adding the alphanumeric text string to a table cell dictionary and removing the alphanumeric text string from an OCR dictionary; and
generating, with the hardware processor, an output file that comprises the plurality of data.

60. The method of claim 59, further comprising prior to performing the OCR on the page, performing an image preprocess on the at least one page, where performing the image preprocess comprises determining a rotation of the at least one page, and where determining the rotation of the at least one page comprises parsing a text file generated by the OCR to determine whether to apply rotation to the at least one page.

61. The method of claim 60, wherein performing the image preprocess comprises removing horizontal and vertical lines on the page, the method further comprising determining the horizontal and vertical lines with a closing morphological transformation using horizontal and vertical kernels.

62. The method of claim 60, wherein performing the image preprocess comprises determining a skew of the page, the method further comprising, based on the skew determination, manipulating the page to remove or reduce the skew.

63. The method of claim 59, wherein the electronic document comprises a well file, and the table comprises a directional survey of the well file.

\* \* \* \* \*

UNITED STATES PATENT AND TRADEMARK OFFICE
CERTIFICATE OF CORRECTION

PATENT NO. : 10,740,603 B2
APPLICATION NO. : 15/928349
DATED : August 11, 2020
INVENTOR(S) : Chris Randy Larsen Davis and Yenming Mark Lai It is certified that error appears in the above-identified patent and that said Letters Patent is hereby corrected as shown below:

In the Claims

Column 17, Line 52, Claim 16, delete "2" and insert -- 2, --, therefore.

Column 20, Line 44, Claim 37, after "the" insert -- page --, therefore.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*